United States Patent [19]
Reynolds et al.

[11] Patent Number: 5,444,868
[45] Date of Patent: Aug. 22, 1995

[54] MODULAR MOBILE RADIO SYSTEM

[75] Inventors: Gary R. Reynolds; Richard Culbertson, both of Lynchburg; Ralph R. Sherman, Jr., Campbell, all of Va.

[73] Assignee: Ericsson GE Mobile Communications Inc., Lynchburg, Va.

[21] Appl. No.: 36,206

[22] Filed: Mar. 23, 1993

[51] Int. Cl.6 .......................... H04B 1/38; H04B 1/08
[52] U.S. Cl. ........................................ 455/89; 455/90; 455/128; 455/349
[58] Field of Search .................. 455/89, 90, 347, 348, 455/349, 54.1, 128, 127

[56] References Cited

U.S. PATENT DOCUMENTS

| 5,073,978 | 12/1991 | Mastrippolito | 455/349 |
| 5,303,422 | 4/1994 | Tsukuda | 455/349 |

FOREIGN PATENT DOCUMENTS

| 0394747 | 10/1990 | European Pat. Off. | 455/90 |
| 0018825 | 1/1988 | Japan | 455/90 |
| 0004293 | 4/1990 | WIPO | 455/54.1 |

OTHER PUBLICATIONS

D'Alio, Leonard, J., "Handie-Talkie Covers 10-Meter Band", *Radio Electronics*, Jan. 1961, pp. 51-53.

*Primary Examiner*—Edward F. Urban
*Assistant Examiner*—Mark D. Wisler
*Attorney, Agent, or Firm*—Nixon & Vanderhye

[57] ABSTRACT

The mobile radio system includes a plurality of power amplifier modules having discrete power levels, a common transceiver module and a plurality of control head modules having different control functions. Selected ones of the power amplifiers and control heads are electrically and mechanically coupled to opposite ends of the transceiver. In one form, the control head may be remotely mounted and electrically coupled to the selected power amplifier. A common bracket is used to mount a radio having selected ones of the power amplifiers coupled to the transceiver with a selected control head. In a further embodiment, a receptacle having electrical fittings at its rear end and an opening at its opposite end receives the radio through its open end with the electrical connections being automatically coupled to one another upon final seating of the radio in the receptacle. The radio includes a handle which forms a latch for releasably securing the radio in the receptacle.

11 Claims, 10 Drawing Sheets

MODULAR MOBILE RADIO SYSTEM

TECHNICAL FIELD

The present invention relates to a modular mobile radio system having a plurality each of different discrete power amplifiers for electrical and mechanical connection with a common transceiver and a plurality each of different discrete control heads for connection to the common transceiver whereby radios of selected different power levels and control functions can be readily manufactured and supplied. The present invention additionally relates to mounting brackets for mounting the radio.

BACKGROUND

Mobile radios have previously been provided in different configurations, for example, variously configured and functionally different control head section interfaces. One control head section may, for example, provide menu-driven access to the radio functions and another control head section may have a programmable keypad for one-touch access to the various functions. Additionally, various power amplifier sections of mobile radios have been previously provided with different power levels. In these radios, however, the user would generally select a particular control head section and a particular power level and the radio would be provided as a totally integrated unitary unit. The manufacture of the radio, however, is complicated by the integrated unitary nature of the unit and it has been found desirable to provide a modular radio unit such that its various components, such as the power amplifier, transceiver and control head, can be modularized and readily and easily connected to one another to form a unitary radio.

A modularity approach to a mobile radio system is further complicated, however, by the requirements for mounting the radio in various configurations. For example, mobile radios are oftentimes mounted on the dash of a vehicle or from a ceiling, frequently requiring the mounting bracket to be custom-made, depending upon the nature of the desired mounting. Further, in certain geographic locations, it has been found desirable to provide a cassette-type mobile radio with a mounting bracket wherein the radio may be readily and easily removed from the mounting bracket and reconnected thereto for immediate use. Thus, there has been a need to provide a mobile radio having the desired power level and control head functions with substantially a universal mounting, while simultaneously avoiding the necessity to provide an integral unitary mobile radio unit for each desired end use and mounting.

DISCLOSURE OF THE INVENTION

According to the present invention, there is provided a mobile radio system having modularized components readily and easily interconnectable one with the other, both electrically and mechanically, to afford the various power levels and functions needed and desired by the end user in a particular radio and in a manner which would facilitate the mounting of the radio with the selected components and functions in any one of the conventional mounting environments. To accomplish this, the present mobile radio system includes a transceiver module, a plurality of discrete different power amplifier modules having different power levels, and a plurality of discrete different control head modules having different functions. The transceiver module is common to the system and has both electrical and mechanical connections at its front and rear ends for connecting a selected control head module and a selected power amplifier module to the front and rear ends of the transceiver module, respectively. (The transceiver module, power amplifier modules and the control head modules are sometimes herein referred to as the transceiver, power amplifiers and control heads, respectively). Thus, not only is the transceiver common to the modular radio system, but the electrical and mechanical connections of the control heads and power amplifiers are likewise common to the corresponding connections of the transceiver, whereby any one of a plurality of control heads and power amplifiers can be connected mechanically and electrically to the transceiver.

With respect to the electrical connections, power, antenna and systems connections are provided in quick connect/disconnect terminals for ready and easy connection between the power amplifiers and transceiver. For the control head to transceiver connection, a quick connect/disconnect terminal is used as part of a ribbon-type electrical connection. More particularly, the mechanical connections are accomplished by a unique mechanical coupling of the selected control head to the front end of the transceiver using a latching mechanism and only two screws. A simplified mechanical connection is also used for coupling a selected power amplifier to the rear end of the transceiver. Moreover, the mechanical connections are afforded in a manner which enables the connections to be waterproof. For example, the mechanical connection between the selected control head and transceiver includes generally L-shaped latching brackets oppositely directed on the control head and transceiver, together with complementary tapered surfaces on the control head and transceiver having registering screw holes. By engaging the L-shaped brackets one with the other and displacing the control head and transceiver toward one another to register the screw holes, with the sealing gasket located between the control head and transceiver, only a pair of screws is necessary to mechanically connect the selected control head and common transceiver.

To facilitate the mounting of the modular radio, the cooling fins or ribs on the power amplifiers are formed to provide a further function, i.e., as part of a mounting system for mechanically connecting differently configured radios to a common bracket. More particularly, the bracket includes a generally flat base plate having a pair of upstanding side legs adjacent the rear end of the bracket with inwardly turned flanges for engaging in grooves defined by the cooling fins of the selected amplifier. The forward end of the bracket also includes a pair of upstanding flanges having connections for mating with a selected pair of mechanical connections carried by the transceiver. That is, the transceiver is provided with pairs of mechanical connections, e.g., tapped openings, whereby a common bracket may be used to mount the radio with selected discrete ones of the amplifiers and control heads. With the selected control head and selected amplifier secured to the front and rear ends of the transceiver, respectively, the assembled radio may be displaced longitudinally along the bracket to engage the inwardly directed flanges at the rear end of the bracket in the grooves defined by the cooling fins. The flanges at the forward end of the bracket have openings which register with one or the other of the first and second pairs of tapped openings in the sides of the transceiver whereby the registering openings may receive screws for threadedly securing the radio to the bracket and preventing longitudinal displacement of the radio relative to the bracket. Moreover, the radio may be secured over or under an inverted bracket. In both positions, the radio is carried by the four-point support provided by the flanges engaging the grooves of the cooling fins of the amplifier and the screws coupling the bracket and the transceiver.

In an alternate mounting system according to the present invention, there is provided a four-sided bracket or receptacle having a closed rear end and electrical and antenna connections therein facing the open opposite end of the bracket. With a selected amplifier secured to the transceiver and which selected amplifier has complementary sized and located electrical and antenna connections, the radio may be inserted through the open end of the bracket such that the electrical and antenna connections automatically connect with one another when the radio is fully seated in the bracket. To maintain the radio within the bracket, the radio is provided with a handle pivotally coupled to the control head between two positions; a first position with the handle projecting forwardly of the radio whereby the radio can be withdrawn from the bracket and carried by the handle and a second position wherein the handle is pivoted into latching engagement with the bracket to releasably maintain the radio in the bracket. More particularly, the bracket has a pair of flanges adjacent its open end. The handle has a latching slot at its lower end adjacent its pivoted connection to the control head. When the radio is fully seated in the bracket, the handle may be pivoted to engage the flange in the slot. The flanges and slots are configured to maintain the radio latched to the bracket until the handle is manually pivoted forwardly into a carrying position. The movement of the handle from the latched position to the carrying position disengages the latch, enabling the radio to be withdrawn from the bracket.

In a preferred embodiment according to the present invention, there is provided a modular mobile radio system comprising a transceiver module having opposite front and rear ends, a plurality of power amplifier modules having a different discrete power levels, each of the power amplifiers having at least one electrical connection for operatively electrically coupling a selected one of the amplifiers to the rear end of the transceiver, each of the amplifiers having a mechanical connection such that the selected one of the amplifiers may be operatively mechanically coupled to the transceiver and a control head electrically coupled to one of the transceiver and the selected one of the amplifiers.

In a further preferred embodiment according to the above invention, there is provided a modular mobile radio system comprising a radio having a power amplifier, transceiver and a control head electrically coupled to one another and with at least one electrical connection at a rear end of the amplifier, a bracket having top, bottom and side walls defining a receptacle and a wall at one end of the receptacle opposite an opening at the opposite end of the receptacle for receiving the radio, an electrical connection fitting in the one end wall for electrically coupling with the electrical connection on the amplifier when the radio is inserted through the opening into the receptacle and finally seated therein, a handle pivotally carried by the radio between a radio carrying position upon removal of the radio from the receptacle and a latching position releasably securing the radio to the receptacle, the handle and the receptacle carrying latching parts engageable with one another when the handle is in the latching position and the radio is finally seated in the receptacle.

Accordingly, it is a primary object of the present invention to provide a modular mobile radio system wherein various discrete different components of the radio can be selected for assembly to form a radio and provide a mounting system comprised of a common mounting bracket for mounting radios having different modularized components.

BRIEF DESCRIPTION OF THE DRAWINGS

FIG. 11 is a side elevational view illustrating a mobile radio according to the present invention mounted in cassette from;

BEST MODE FOR CARRYING OUT THE INVENTION

Figure 1A:
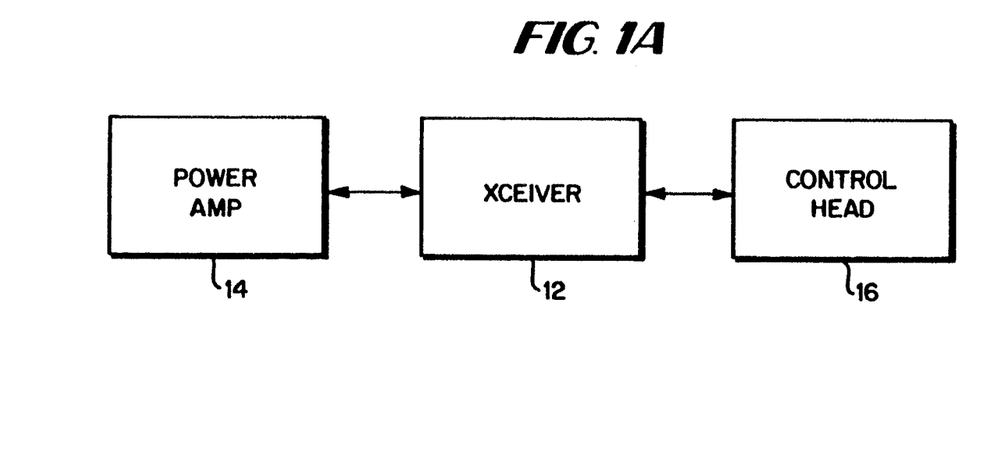
FIG. 1A is a schematic diagram illustrating a modular radio system according to the present invention and showing a power amplifier, transceiver and control head connected to one another to form an integrated radio unit.
Figure 1B:
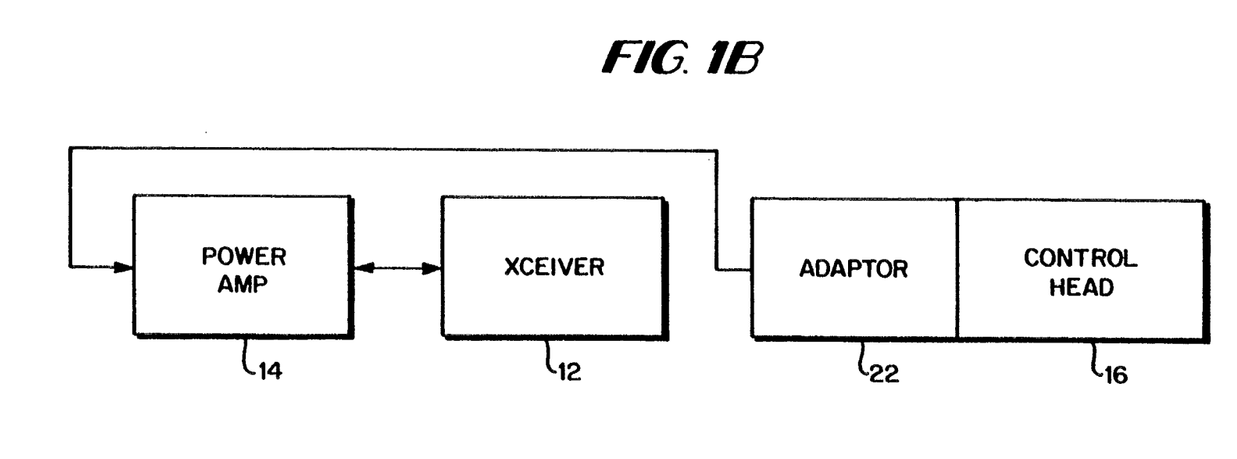
FIG. 1B is a schematic diagram illustrating the modular radio system hereof with the control head mounted remote from the transceiver and power amplifier.
Figure 2:
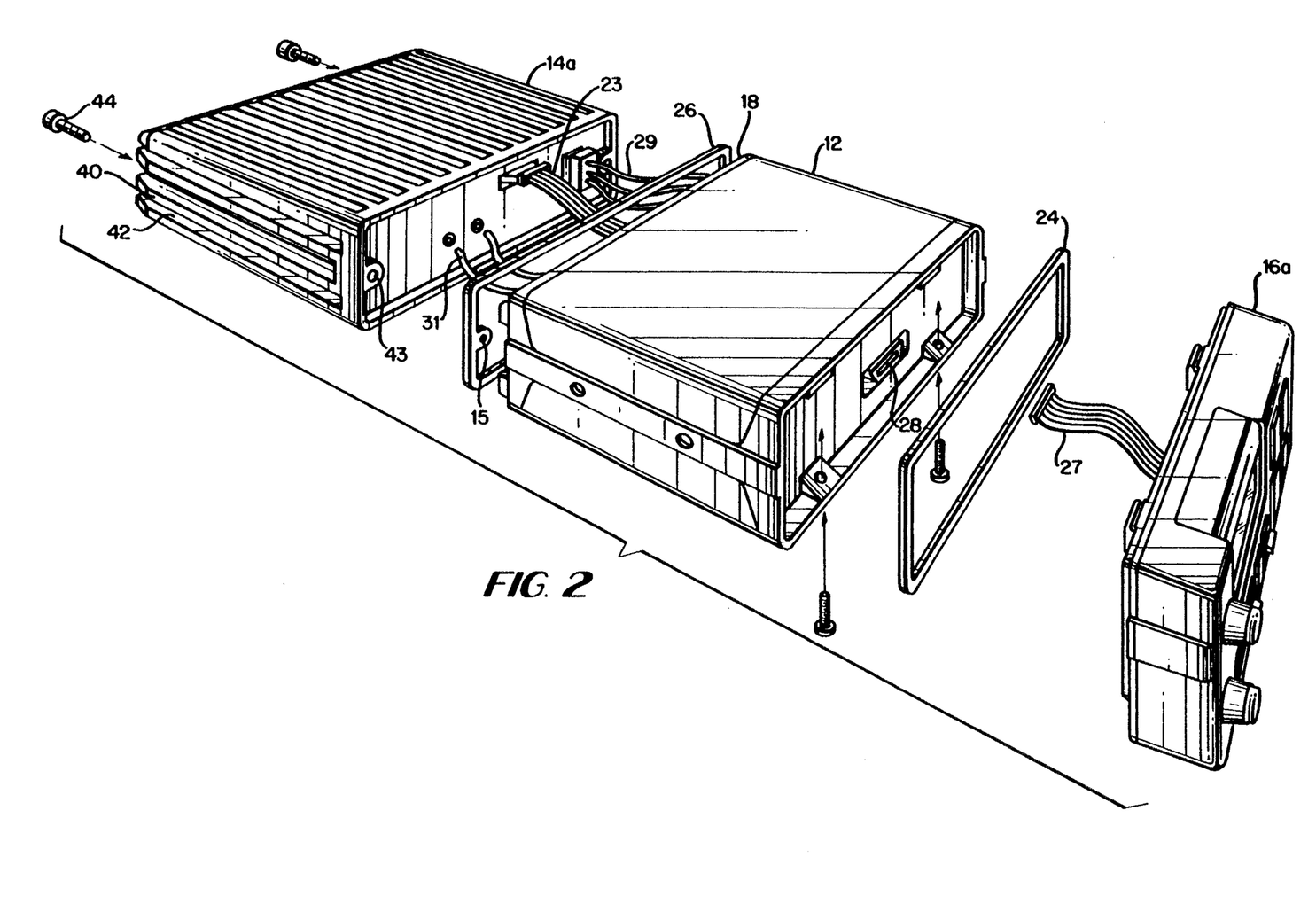
FIG. 2 is an exploded perspective view illustrating the modular mobile radio system hereof with a common transceiver and a selected power amplifier and control head.
Figure 3:
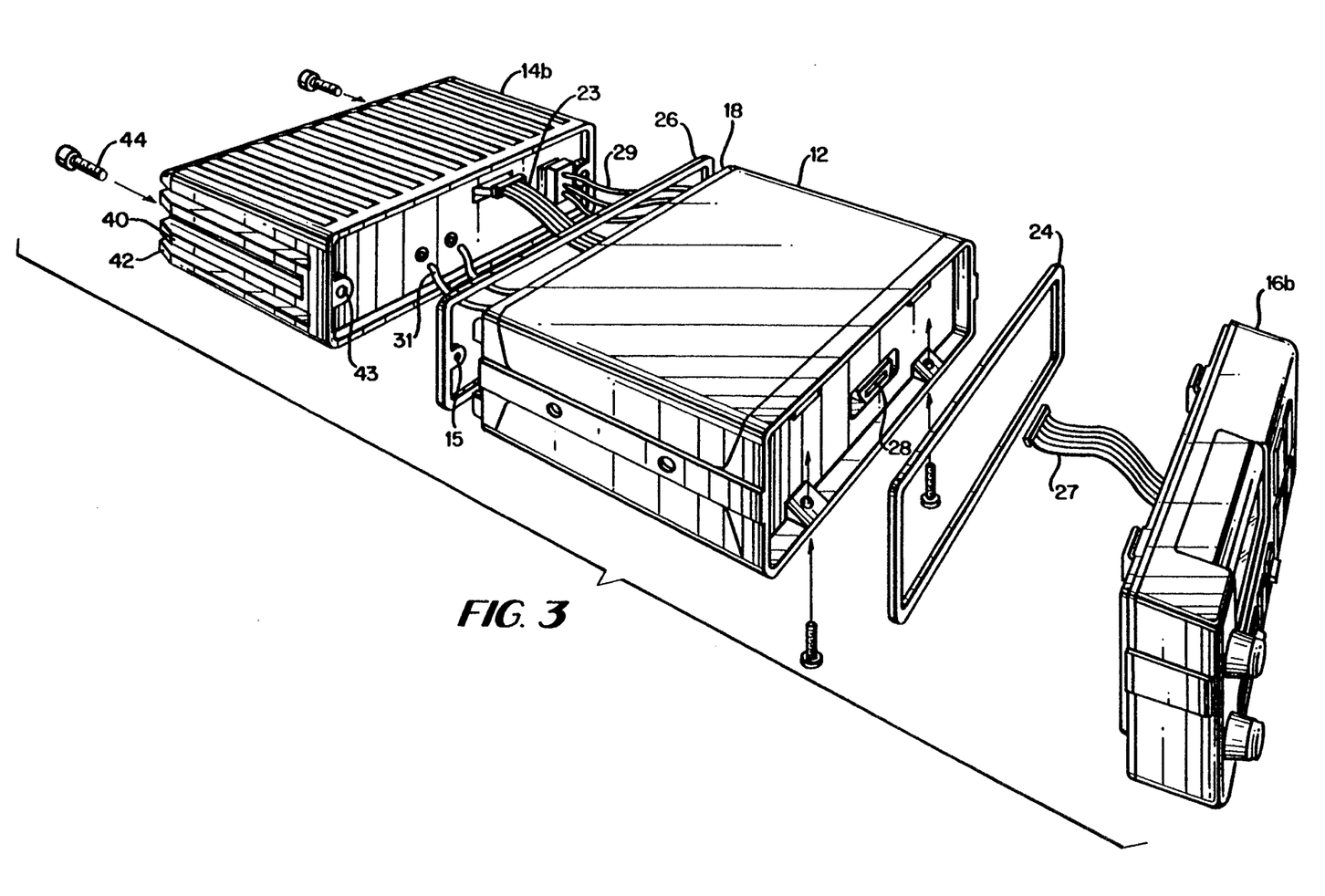
FIG. 3 is a view similar to FIG. 2 illustrating a different power amplifier and control head for connection to the common transceiver.
Figure 4:
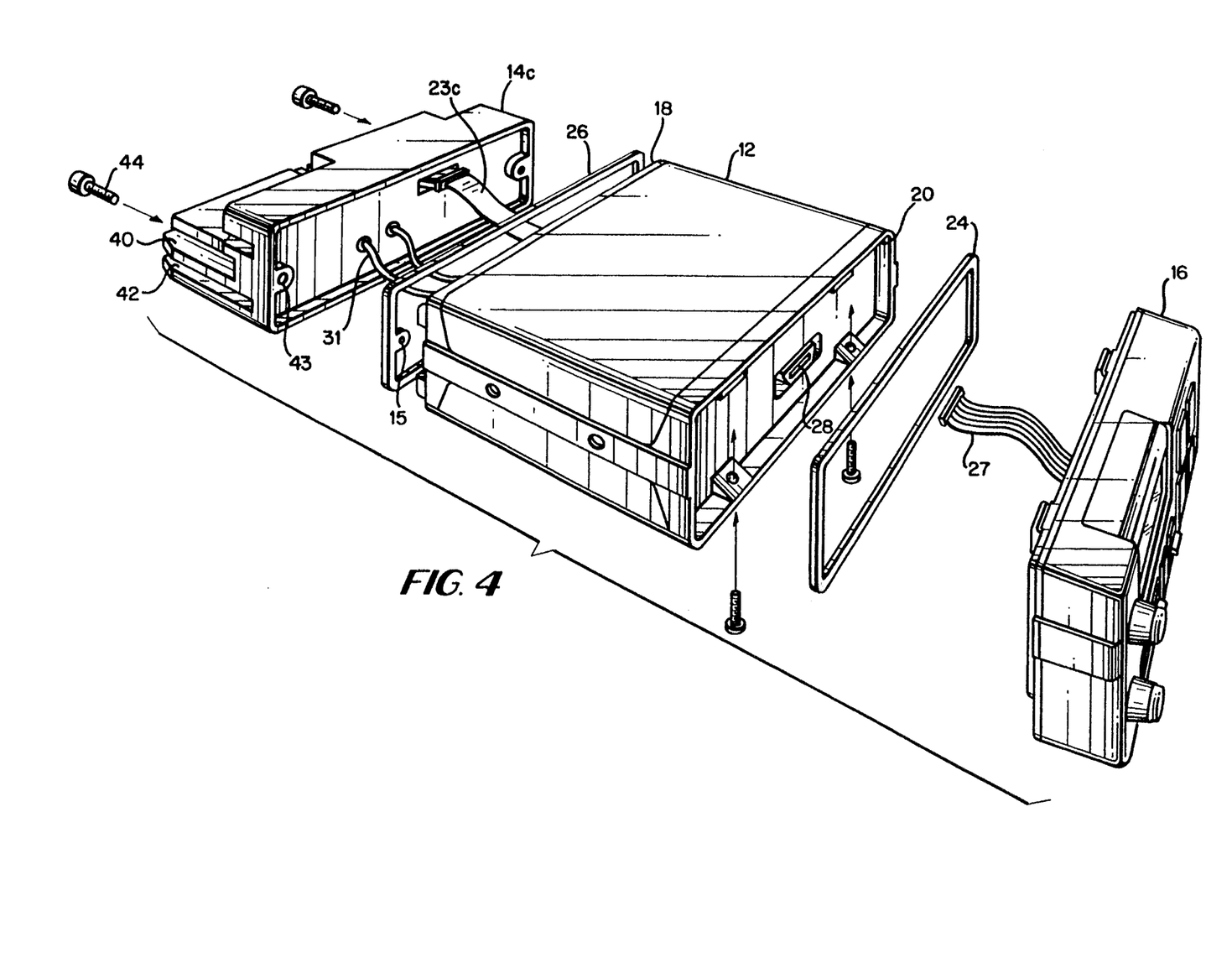
FIG. 4 is a view similar to FIG. 2 illustrating a further power amplifier and control head coupled to the transceiver.

Referring now to the drawing figures, particularly to FIGS. 1A and 1B, the present invention provides a modular mobile radio comprised of modular components which can be assembled to form different radio packages with a full range of functions and low, intermediate and high power levels in basic radio package dimensions. The basic components of the modular mobile radio hereof comprise a transceiver module 12, a plurality of power amplifier modules 14 having different discrete power levels and a plurality of different discrete control head modules 16 with different interfaces affording, for example, menu-driven or programmable keypad functions, i.e., basic and full feature control heads. As an example, and as illustrated in FIGS. 2 through 4, any one of different power amplifiers 14a, 14b and 14c may be applied, both mechanically and electrically, to the rear end 18 of the common transceiver 12. Additionally, either one of the two control head modules illustrated in FIGS. 2 and 3, i.e., control head modules 16a and 16b, may be mechanically and electrically connected to the front end 20 of the common transceiver 12. The control head module of FIG. 4 may comprise either one of control head modules 16a of 16b.

As illustrated in FIG. 1A, the selected power amplifier 14 and the selected control head 16 may be mechanically and electrically connected to the transceiver 12 at opposite ends to form an integrated mobile radio having identical cross-sectional dimensions throughout substantially its entire length, the differences in dimensions being solely in the longitudinal dimension. Additionally, and referring to FIG. 1B, the mobile radio 10 hereof has a remote control option. For example, either of control heads 16a and 16b may be fitted with a common adapter 22 on its rear end and electrically coupled to the rear end of the power amplifier as schematically illustrated in FIG. 1B. For this remote control option, the front end of the transceiver would be fitted with a cap plate, not shown. Thus, the control head and adapter may be located remotely from the combined transceiver and power amplifier. For example, the control head in this form may be mounted on the dash of a vehicle and electrically coupled to the transceiver and selected power amplifier located in the trunk of the vehicle.

Referring now to FIGS. 2, 3 and 4, a gasket 24 is disposed between the selected control head and the front end of the common transceiver 12. Similarly, a gasket 26 is disposed between the selected power amplifier 14 and the rear end 18 of the common transceiver 12. Gaskets 24 and 26 provide a waterproof seal between these modular components. To make the electrical connections between each of the control heads 16a and 16b, an electrical interconnect ribbon 27 having a quick connect/disconnect at its distal end is received in an opening 28 in the forward face 20 of the common transceiver 12 and may readily be connected to transceiver 12. Similarly, there are provided electrical connections between the rear end 18 of the transceiver 12 and the selected power amplifier 14 which are of the quick connect/disconnect type. For example, in FIGS. 2 and 3, those electrical connections comprise a systems ribbon connector 23, a power interconnect 29 and antenna leads 31. In FIG. 4, the power and systems connection are combined in a single electrical ribbon connector 23c. Thus, once the components of the system are selected, the electrical interconnects can be rapidly and easily made among the selected components.

Figure 5:
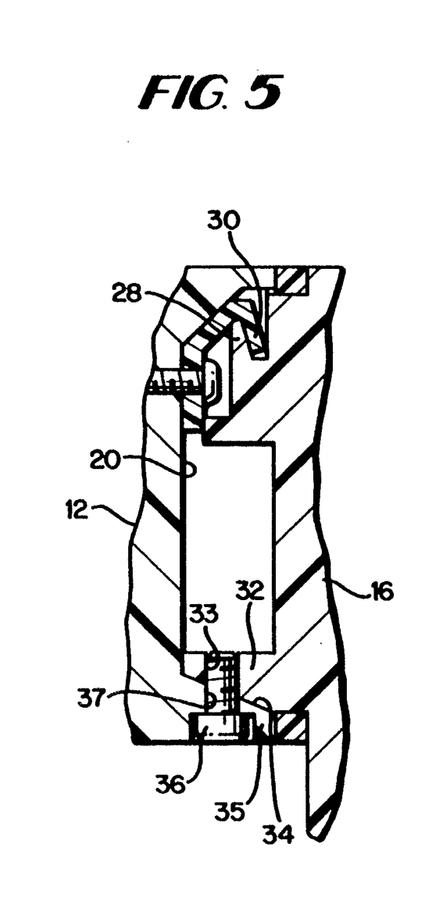
FIG. 5 is an enlarged fragmentary cross-sectional view illustrating a mechanical connection between a selected control head and the transceiver.

To mechanically connect the selected control heads 16 to the common transceiver 12 as best illustrated in FIG. 5, each discrete control head 16 has a pair of upwardly projecting flanges 28 extending from the rear face of the control head for engaging behind depending flanges 30 at the front end 20 of the transceiver 12. A pair of projections 32 on opposite sides of the rear face of control head 16 have tapered undersurfaces and a tapped bore 33. These tapered undersurfaces cooperate with bosses 35 having complementary tapered surfaces 34 formed on the front face 20 of transceiver 12. The bosses 35 have boreholes 37. Accordingly, when the flanges 28 underlie flanges 30 and the selected control head 16 is displaced toward the transceiver 12, bringing the bores 33 into alignment with the boreholes 37 and the tapered surfaces into engagement, screws 36 can be inserted from the underside of the radio to secure the selected control head and the common receiver one to the other and with the sealing gasket 24 therebetween.

From a review of drawings FIGS. 2-4, each of the amplifiers 14a, 14b and 14c have a plurality of cooling fins or ribs 40 which define grooves 42 therebetween. Centrally of the transceiver, and on opposite sides thereof, two tapped boreholes open through the end face 18. A pair of screws 44 are received within grooves 42 and through boreholes 43 between the end face of the amplifier and the groove for securing the selected amplifier to the common transceiver. The screws 44 also pass through openings 15 formed through the opposite sides of the gasket 26 so that gasket 26 is properly located to effect a seal between the selected power amplifier and the transceiver.

Consequently, it will be appreciated that to assemble a mobile radio unit according to the present invention, a power amplifier from the plurality of power amplifiers having different power levels and a control head from the plurality of discrete control heads having different functions are selected for connection with the common transceiver. The control head is electrically coupled to the transceiver by inserting the ribbon electrical connection into a slot on the front face of the transceiver where the electrical connection is made. With the gasket 24 between the transceiver and control head, the flanges 28 are received behind the flanges 30 and the boreholes and bores through the tapered surfaces are aligned. Screws 36 then finally mechanically connect the selected control head and the transceiver one to the other, completing the mechanical connection therebetween. To connect the selected power amplifier and the common transceiver, the gasket 26 is applied to the rear end face of the transceiver. As illustrated in FIGS. 2 and 3, the ribbon electrical connection, the power connection and the antenna connections are manually coupled to the opposing receiving connectors to effect the electrical connection between the selected power amplifier and common transceiver. Screws 44 are received through the boreholes in the power amplifier and gasket and into tapped openings on the rear face 18 of transceiver 12 to secure the selected power amplifier to the transceiver. It will thus be appreciated that selected modular components can be readily and easily electrically and mechanically coupled to one another to form the radio unit. Note particularly that only four screws are necessary to mechanically interconnect the three modular units.

Referring now to FIGS. 6–9, there is illustrated a bracket 50 for mounting a mobile radio with either of the two illustrated control heads 16a or 16b connected to the transceiver and either of the power amplifiers 14a or 14b of FIGS. 2 and 3, respectively, coupled to the transceiver. The bracket 50 includes an elongated base plate 51 having, at the rear end of bracket 50, a pair of upstanding legs 52 along the opposite sides of the base plate. Legs 52 have inturned flanges 54 at their upper ends. Intermediate the ends of the plate, there is also provided a pair of inturned flanges 56 forming guides for receiving the lower or upper horizontal surface of the radio when the radio is being attached to the bracket. Base plate 51 has a plurality of openings therethrough, not shown, to facilitate securement of the bracket to a surface and which surface can be either upwardly or downwardly facing such that the radio can be mounted on an underlying surface or depend from an overlying surface, such as a ceiling. At the forward end of bracket 50, there is provided a pair of upstanding flanges 58, each flange having an opening for receiving a screw 62. Along the opposite sides of the transceiver 12 are first and second pairs of tapped openings 64 and 66 spaced longitudinally one from the other. The openings 64 and 66 are formed along a medial plane through the radio between its generally parallel top and bottom longitudinal surfaces. The openings 62 of flanges 58 are spaced above guides 56 to register with one or the other of openings 64 and 66 and are thereby spaced half the depth of the radio from the guides 56.

Figure 6:
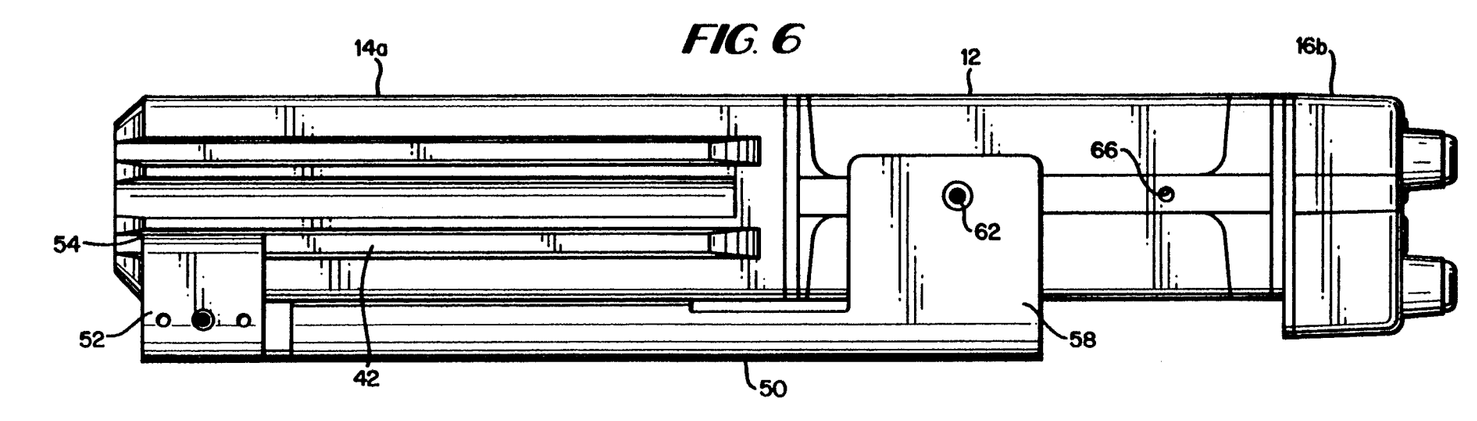
FIG. 6 is a side elevational view of a mobile radio according to the present invention with a selected power amplifier forming part of the radio and a bracket for mounting the radio along its undersurface.

To mount the radio to the bracket, the radio is inserted longitudinally between the front flanges 58 and against the guide surfaces 56. By displacing the radio longitudinally and rearwardly, the inturned flanges 54 engage in the grooves 42 between the laterally projecting ribs 40 forming the cooling fins of the selected power amplifier. By forming the flanges 54 and grooves 42 complementary to one another, a snug sliding fit is provided. Depending upon the longitudinal dimension of the selected power amplifier, the openings for screws 62 are aligned with either the first or second pairs of tapped openings 64 and 66. For example, in FIG. 5, wherein the power amplifier 14a is coupled to the transceiver as previously described, the rearmost first pair of tapped openings 64 receive screws 62. The radio is accordingly precluded from longitudinal movement relative to the bracket by the screws, as well as movement in any other direction by the four-point mounting provided by the two screws and the cooperating flanges 54 and grooves 42 of the amplifier. In FIG. 6, the radio is provided with a longitudinally reduced amplifier 14b. Consequently, when the radio is disposed along bracket 50 and flanges 54 engage in the grooves, the openings for screws 62 are aligned with the forward or second pair of tapped openings 66 in the transceiver whereby the screws 62 connect the radio and bracket to one another as previously described.

Figure 10:
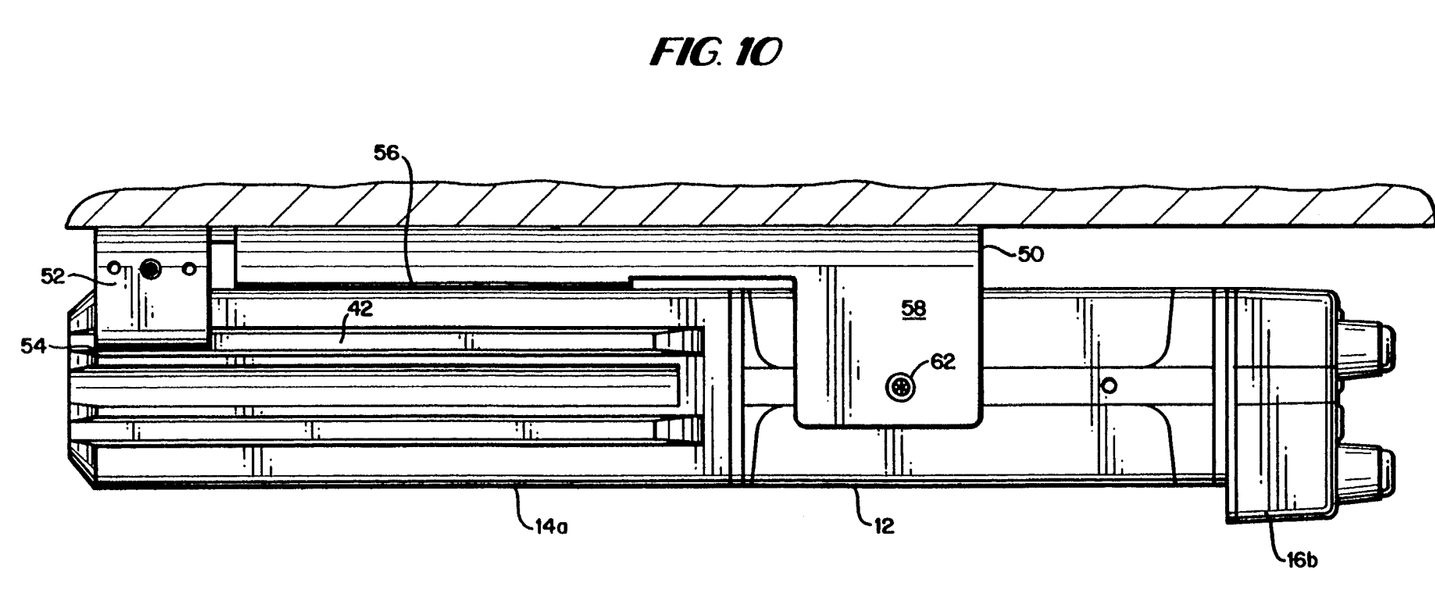
FIG. 10 is a view similar to FIG. 6 illustrating the identical radio as in FIG. 6 carried by the same bracket but inverted to mount the radio from an overhead.

It will also be appreciated from a review of these drawing figures that the laterally projecting grooves of the amplifiers are arranged symmetrically on opposite sides of the medial plane through the radio. Consequently, the radio can be connected to a bracket 50, as illustrated in these drawing figures secured to an underlying support surface, or can be supported from an inverted bracket, i.e., a bracket attached to an overlying support surface or a ceiling as illustrated in FIG. 10. To secure the radio to an overlying support surface, the radio is inserted into bracket 50 against guides 56 and displaced longitudinally and rearwardly to locate the flanges 54 in the grooves 42 along opposite sides of the amplifier. When the first or second pair of tapped openings are aligned with the openings for screws 62 in flanges 58, the screws 62 are threaded into place. The radio is thus supported by the four-point mounting system as previously described.

Figure 11:
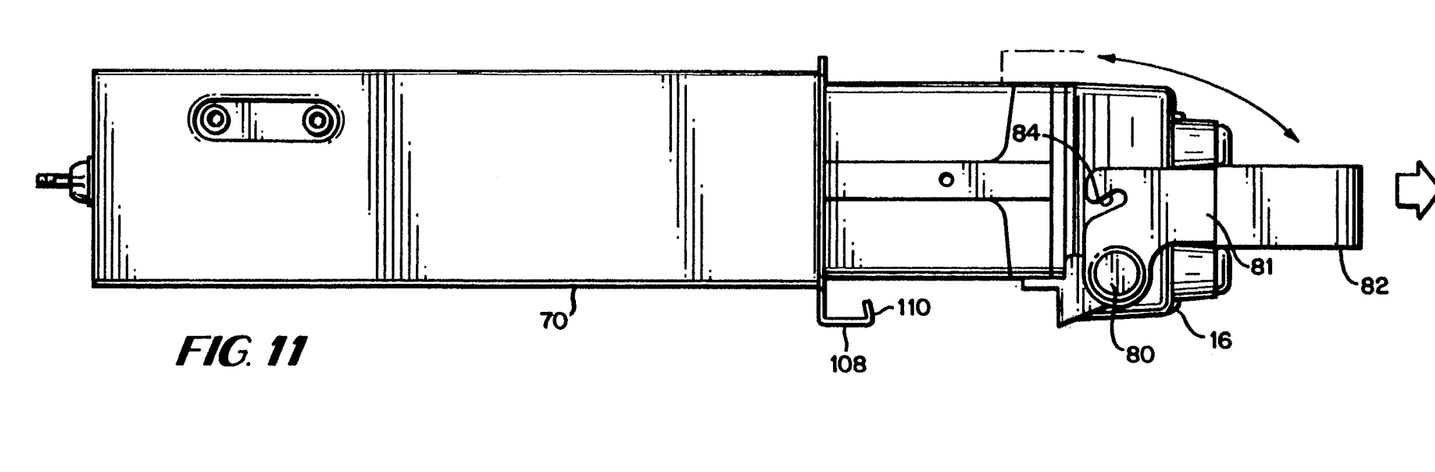
Figure 12:
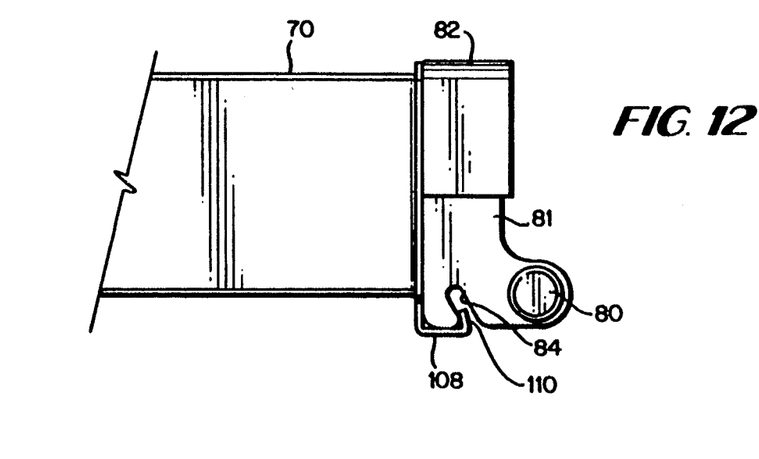
FIG. 12 is a fragmentary side elevational view illustrating the latching connection between the radio and the bracket of FIG. 11.
Figure 13:
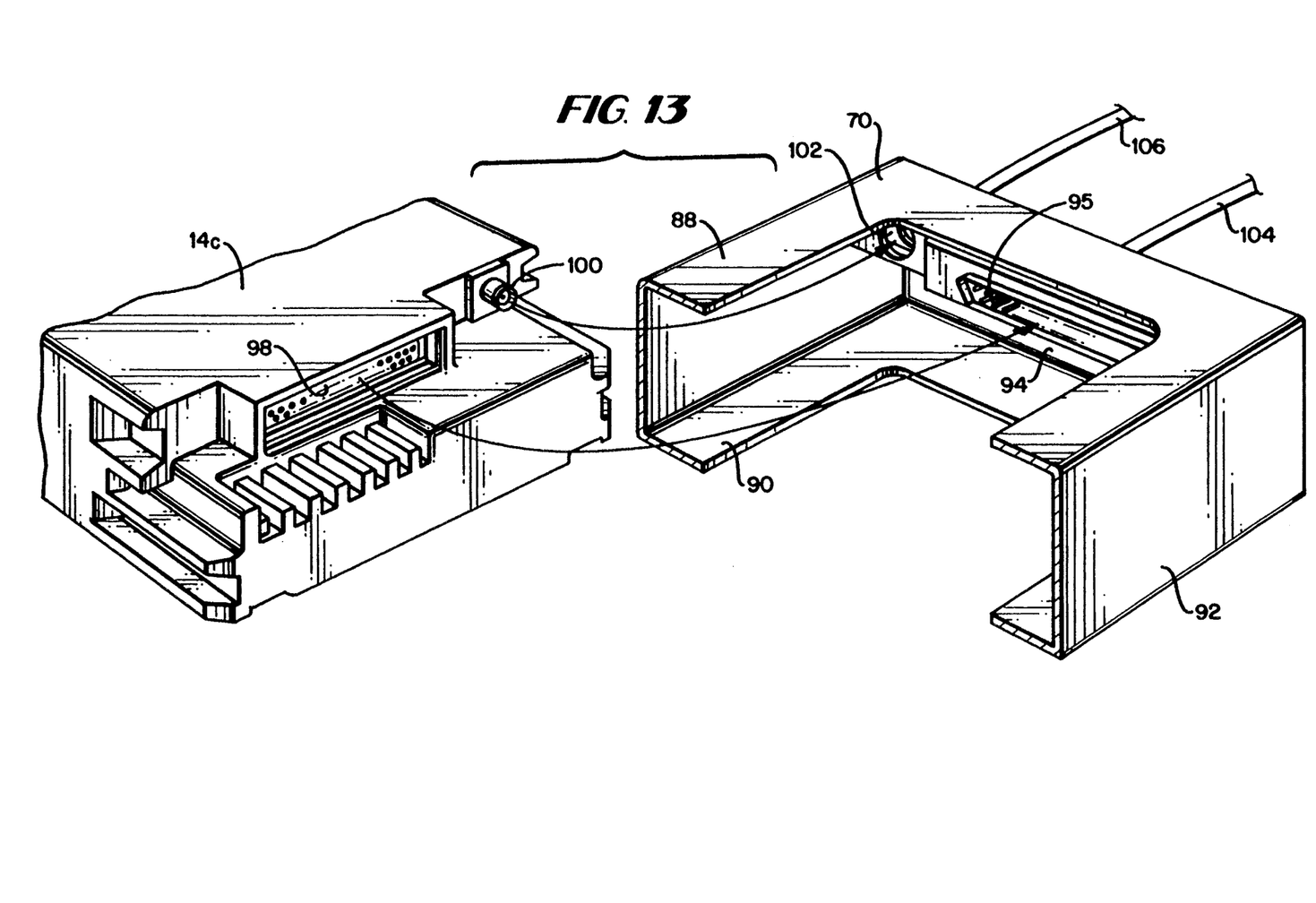
FIG. 13 is a fragmentary exploded perspective view illustrating the electrical and antenna connections between the rear end of the amplifier and the back wall of the mounting bracket of FIG. 11 upon insertion of the radio into the bracket.

Referring now to FIGS. 11–13, there is illustrated a bracket 70 for mounting the radio unit hereof in a manner such that the radio unit can be readily and easily releasably removed from and inserted into the bracket with the electrical connections being automatically disconnected and reconnected, respectively. In this form, the radio unit also affords a handle which enables the radio unit to be withdrawn, carried and reinserted into the bracket and the radio unit to be detachably secured to the bracket. In this embodiment, power amplifier 14c is secured to the rear end of transceiver 12 and one of the two control heads 16a and 16b is secured to the radio, forming the radio unit. The control head 16a or 16b includes outwardly projecting pins 80 along respective lower opposite sides of the control head. The pins mount the legs 81 of a generally U-shaped handle 82 pivotal between a position in which the base of the U-shaped handle overlies the front face of the control head, as illustrated by the full lines in FIG. 12, and a latching position in which the base of the U-shaped handle overlies the top longitudinal surface of the radio as illustrated by the dashed lines in FIG. 11 and the full lines in FIG. 12. Each leg 81 of the handle is provided with a slot 84 which opens through the end of the leg and is inclined rearwardly away from the face of the control head in the latched condition, as illustrated in FIG. 12.

Bracket 70 includes a receptacle having top, bottom and lateral sides 88, 90 and 92, respectively, and a substantially closed end 94 opposite an open end of the receptacle for receiving the radio. The top, bottom and side walls are complementary shaped and sized relative to the cross-sectional dimensions of the radio to snugly receive the radio when inserted into the open end of the receptacle. The rear end of the receptacle includes an electrical pin connection fixture 95 for engaging in a fitting 98 on amplifier 14c and which fitting 98 has openings for receiving the pins whereby power and systems connection may be provided upon reception of the radio within the receptacle. An antenna connection 100 is also provided in the rear end of amplifier 14c for reception in a corresponding opening 102 in the end face 94. The male connection for antenna connection 100 is disposed in opening 102 whereby, upon insertion of the radio into the receptacle to its full extent, the electrical connections, i.e., the power and systems connection and antenna connection, are automatically completed. The electrical connections to the power systems fitting and the antenna fitting are completed by the wires 104 and 106, respectively.

Along the front face of the receptacle, there is provided a depending and forwardly projecting, generally U-shaped bracket 108. The forward flange 110 of the U-shape bracket is bent rearwardly to enable engagement within the slot 84 on the handle 82. Consequently, when the radio is fully seated in the receptacle 86, handle 82 is rotated to the full-line position illustrated in FIG. 9 such that the flange 110 is received in slot 84, thereby releasably locking the radio to the receptacle. The angles of the slot 84 and flange 110 are such that efforts to pull the radio from the receptacle with the handle in the latched position result only in a coupling moment tending to maintain the handle in its latched condition.

Figure 7:
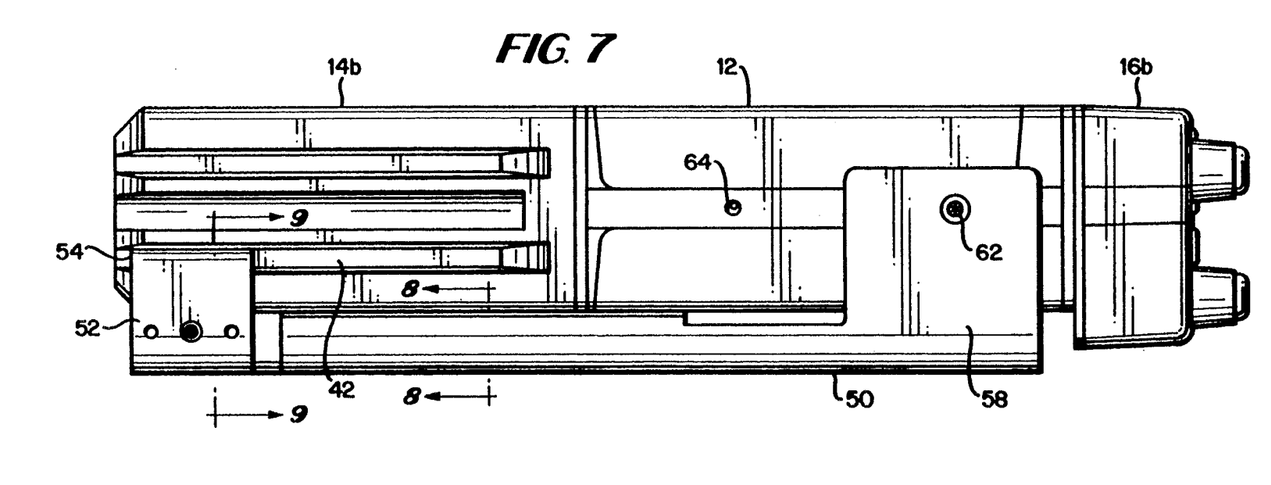
FIG. 7 is a view similar to FIG. 6 illustrating the same radio with a smaller power amplifier and using the same bracket as in FIG. 6.
Figure 8:
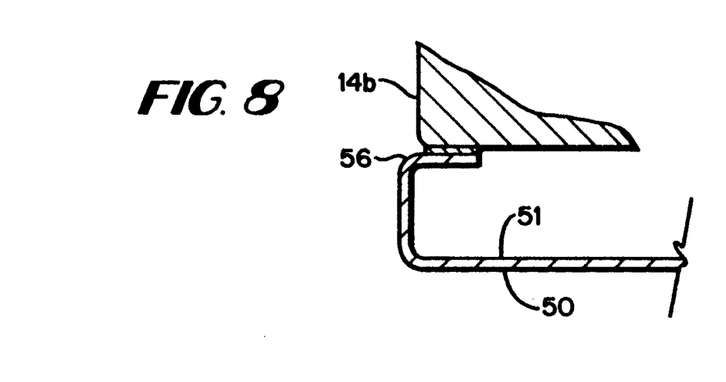
FIGS. 8 and 9 are fragmentary cross-sectional views taken generally about on lines 8—8 and 9—9, respectively, in FIG. 6.
Figure 9:
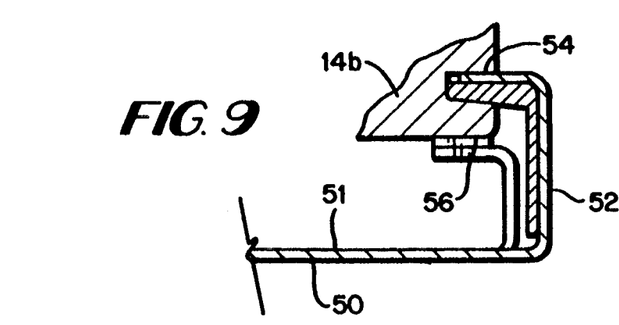

When it is desired to remove the radio from the receptacle, the handle is grasped and rotated, for example, in a clockwise direction, as illustrated in FIG. 7, whereby the slots 84 are moved away from the flanges 110. The handle may then be used to withdraw the radio longitudinally from the receptacle. It will be appreciated that this withdrawing motion also disconnects the radio from the electrical connections at the rear end of the receptacle. To reinsert the radio and establish the electrical connections, the user inserts the radio through the open end of the receptacle and firmly urges the radio against the rear end of the receptacle to effect the electrical connections. Because of the dimensionally snug fit between the radio and receptacle, the electrical connections are aligned one with the other to make the connections upon final seating of the radio in the receptacle. The user then rotates the handle, for example, in a counterclockwise direction, as illustrated in FIG. 11, to establish the latching engagement between the handle and the flange 110 to retain the radio in the receptacle.

Figure 14:
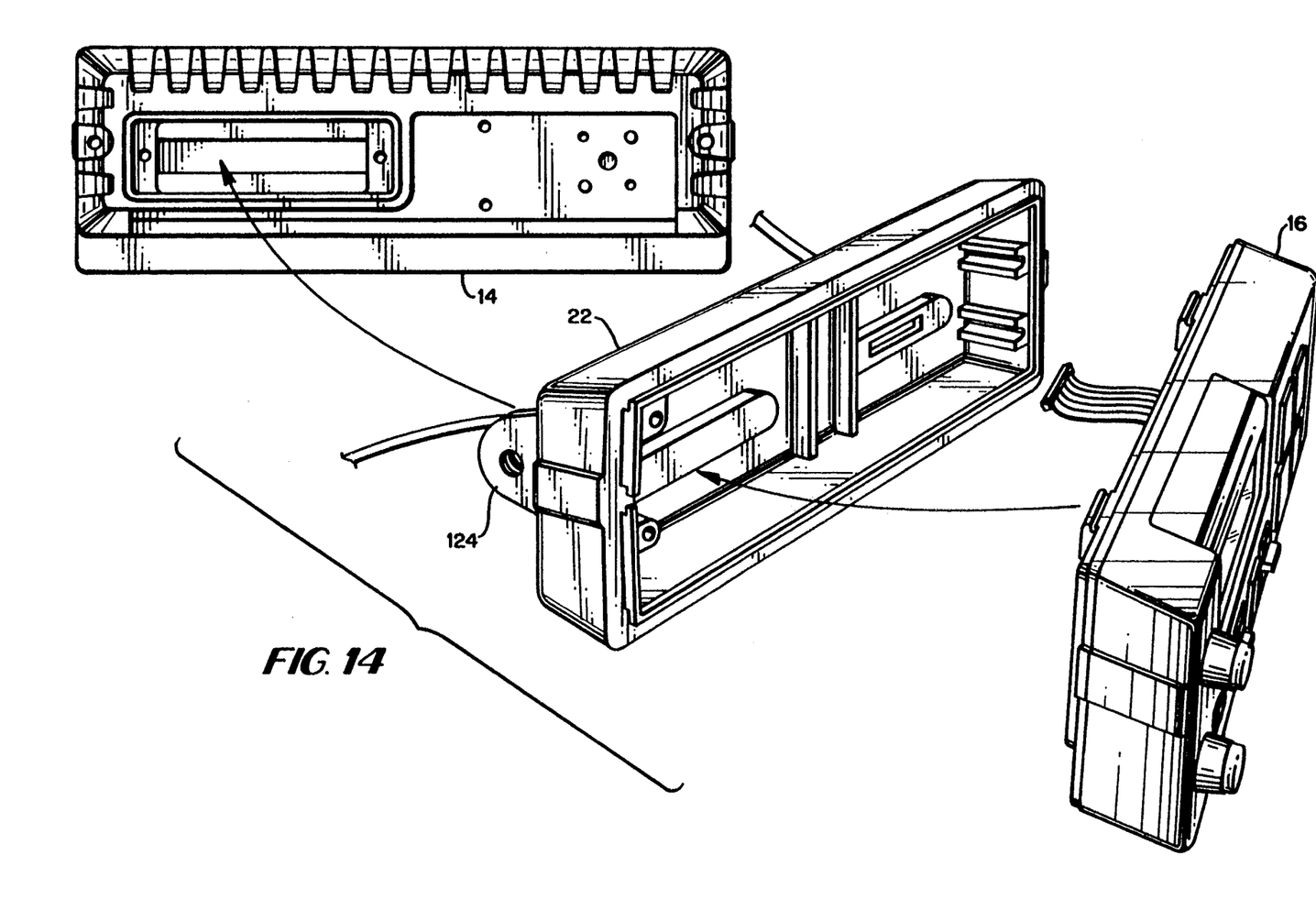
FIG. 14 is an exploded perspective view illustrating the electrical and mechanical connections between the control head and adapter whereby the control head and adapter may be remotely mounted and electrically connected to the back end of the amplifier.

Referring now to FIG. 14, there is illustrated in an exploded view a selected control head 16, an adapter 22 for connection to the back side of the control head 16. The adapter 22 comprises a housing having top, bottom and side walls and a rear wall having a pair of openings containing electrical fittings 120. Electrical lines extend from each of the electrical fittings with one line connecting to another electrical connector on the rear end of the amplifier whereby the adapter and control head combination can be remotely mounted relative to the location of the combined transceiver and power amplifier. The other electrical line is optional and may connect, e.g., with another control head. Thus, to adapt either one of the control heads 16a or 16b for remote mounting of the control head relative to the amplifier and transceiver, the electrical ribbon connector extending from the control head 16 is coupled to the appropriate electrical fitting in the adapter using a quick connect/disconnect coupler. The adapter is then applied to the rear end of the control head and secured thereto by screws. As illustrated in FIG. 14, the rear end wall of adapter 22 includes a pair of ears 124 to facilitate mounting of the combined adapter and control head in the desired location for pivotal movement of the control head.

While the invention has been described with respect to what is presently regarded as the most practical embodiments thereof, it will be understood by those of ordinary skill in the art that various alterations and modifications may be made which nevertheless remain within the scope of the invention as defined by the claims which follow.

What is claimed is:

1. A modular mobile radio system comprising:
   a radio having a power amplifier, transceiver and a control head electrically coupled to one another and with at least one electrical connection at a rear end of said amplifier, a bracket having top, bottom and side walls defining a receptacle and a wall at one end of the receptacle opposite an opening at the opposite end of the receptacle for receiving the radio, an electrical connection fitting in said one end wall for electrically coupling with said electrical connection on said amplifier when said radio is inserted through said opening into said receptacle and finally seated therein, a handle pivotally carried by said radio between a radio carrying position upon removal of the radio from the receptacle and a latching position releasably securing the radio to the receptacle, said handle and said receptacle carrying latching parts engageable with one another when said handle is in said latching position and said radio is finally seated in said receptacle.

2. A modular mobile radio system according to claim 1 wherein said latching parts of said handle and said receptacle, when said handle is in said latching position and said radio is finally seated in said receptacle, are configured whereby attempted withdrawal of the radio from said receptacle causes a coupling moment tending to maintain the handle in its latched condition.

3. A modular mobile radio system according to claim 1 wherein said handle comprises a generally U-shaped handle having leg portions at opposite ends pivotally connected to said radio, the ends of said legs carrying the latching parts carried by said handle, said latching parts, when said radio is seated in said receptacle, lying between the pivotal connection of the handle and the radio and the opening of said receptacle.

4. A modular mobile radio system comprising:
   a transceiver having opposite front and rear ends, and a mechanical connection portion adjacent said rear end thereof;
   a plurality of discrete power amplifier modules having different discrete power levels, each of said power amplifier modules having at least one electrical connection for operative electrical coupling to the rear end of said transceiver;
   each of said amplifier modules having a mechanical connection for coupling with the mechanical connection portion adjacent the rear end of said transceiver whereby only a selected one of said amplifier modules may be operatively, electrically and mechanically, coupled to said transceiver at any given time for amplifying signals transmitted by said transceiver; and
   a control head module electrically coupled to one of said transceiver or said selected one of said amplifier modules;
   said transceiver extending longitudinally and having first and second pairs of mechanical connections along opposite sides thereof, with the first pair of said transceiver mechanical connections being located along said opposite sides of said transceiver closer to said rear end thereof than said second pair of transceiver mechanical connections are located relative to said rear end, a first power amplifier module of said plurality thereof having a longitudinal extent greater than a second power amplifier module of said plurality thereof, a common bracket for mounting a selected one of said first or second amplifier modules and said transceiver to a surface with said selected amplifier module and said transceiver attached to one another, said bracket being elongated and having a pair of flanges at a rear end thereof for engaging said selected one of said first amplifier module or said second amplifier module, and a pair of flanges adjacent a front end of said bracket for mechanically connecting with one of said first or second pairs of transceiver mechanical connections in accordance with the selection of said first amplifier module of said second amplifier module.

5. A system according to claim 4 wherein each of said first amplifier module and said second amplifier module has a plurality of longitudinally extending cooling fins on opposite sides thereof defining grooves therebetween opening through the rear end thereof, said rear flanges being receivable in the grooves of said selected one of said first amplifier module and said second amplifier mode upon sliding said radio with said selected amplifier module longitudinally along said bracket, said front flanges being mechanically connected with one of said first and second pairs of mechanical connections along said transceiver.

6. A system according to claim 4 wherein said transceiver has generally planar top and bottom surfaces, said first and second pairs of mechanical connections lying along a medial plane between and parallel to the planes containing said top and bottom surfaces.

7. A system according to claim 6 wherein said bracket includes a base plate, said pairs of flanges projecting to one side of said base plate, said radio and said bracket being connectable to one another with said base plate overlying said top surface of said radio or underlying said bottom surface of said radio.

8. A system according to claim 7 wherein each of said first amplifier module and said second amplifier module has a plurality of longitudinally extending cooling fins on opposite sides thereof defining grooves therebetween opening through the rear end thereof, said rear flanges being receivable in the grooves of said selected one of said first amplifier module and said second amplifier module upon sliding said transceiver with said selected amplifier module longitudinally along said bracket, said front flanges being mechanically connected with one of said first and second pairs of mechanical connections along said transceiver, said grooves being symmetrically arranged relative to said medial plane to enable engagement of said rear pair of flanges with said grooves when said base plate overlies or underlies said radio.

9. A modular mobile radio system comprising:
- a self-contained transceiver including a discrete housing having opposite front and rear ends and electrical and mechanical connection portions adjacent each of said front and rear ends thereof;
- a plurality of self-contained discrete power amplifier modules having different discrete power levels, each of said power amplifier modules including a discrete housing and having at least one electrical connection for operative electrical coupling with said electrical connection portion adjacent the rear end of said transceiver housing;
- each of said amplifier module housings having a mechanical connection for coupling a discrete amplifier housing with said mechanical connection portion adjacent the rear end of said transceiver housing;
- only a selected one of said amplifier modules being operatively, electrically and mechanically, coupled to said transceiver at any given time whereby said one amplifier module enables amplification of signals transmitted by said transceiver; and
- a plurality of self-contained control head modules having discrete user interfaces different from one another;
- each of said control head modules including a discrete housing having at least one electrical connection for operative electrical coupling with said electrical connection portion adjacent the front end of said transceiver housing;
- each of said control head module housing having a mechanical connection for coupling with the mechanical connection portion adjacent the front end of said transceiver housing;
- only a selected one of said control head modules being operatively, electrically and mechanically, coupled to said transceiver at any given time, whereby said transceiver, said selected one of said amplifier modules, and said selected one of said control head modules form a unitary radio system package with said housings of said transceiver, said selected one of said amplifiers, and said selected one of said control head modules forming an integrated outer casing for said radio system.

10. A system according to claim 9 wherein each of said power amplifier modules has front and rear ends, with said one electrical connections being carried by said front ends thereof, and a second electrical connection carried by the rear end of each said power amplifier module for electrically coupling said power amplifiers to said control head.

11. A modular mobile radio system comprising:
- a self-contained transceiver including a discrete housing having opposite front and rear ends and electrical and mechanical connection portions adjacent said rear end thereof;
- a plurality of self-contained discrete power amplifier modules having different discrete power levels, each of said power amplifier modules including a discrete housing and having at least one electrical connection for operative electrical coupling with said electrical connection portion adjacent the rear end of said transceiver;
- each of said amplifier module housings having a mechanical connection for coupling a discrete amplifier housing with said mechanical connection portion adjacent the rear end of said transceiver housing;
- only a selected one of said amplifier modules being operatively, electrically and mechanically, coupled to said transceiver at any given time whereby said one amplifier module enables amplification of signals transmitted by said transceiver;
- a plurality of control head modules having discrete user interfaces different from one another, an adapter interface having an electrical connection for remotely electrically connecting said adapter interface and said selected one of said amplifier modules, said adapter interface having electrical and mechanical connecting portions for electrically and mechanically connecting said adapter interface and a selected one of said control head modules, each of said control head modules having an electrical connection and a mechanical connection for operative, electrical and mechanical, coupling with the electrical and mechanical connecting portions of said adapter interface, and a mount carried by the mechanically connected adapter interface and said selected one of said control head modules whereby the selected one of said control head modules can be operatively remotely coupled to said selected one of said amplifier modules.

* * * * *